(12) United States Patent
Routhier et al.

(10) Patent No.: US 7,693,221 B2
(45) Date of Patent: Apr. 6, 2010

(54) APPARATUS FOR PROCESSING A STEREOSCOPIC IMAGE STREAM

(75) Inventors: Nicholas Routhier, St-Lambert (CA); Pierre-Hugues Routhier, Varennes (CA); Daniel Malouin, St-Basile-Le-Grand (CA); Etienne Fortin, St-Basile-Le-Grand (CA)

(73) Assignee: Sensio Technologies Inc., Montreal, Quebec (CA)

( * ) Notice: Subject to any disclaimer, the term of this patent is extended or adjusted under 35 U.S.C. 154(b) by 1513 days.

(21) Appl. No.: 10/960,058

(22) Filed: Oct. 8, 2004

(65) Prior Publication Data

US 2005/0117637 A1   Jun. 2, 2005

Related U.S. Application Data

(63) Continuation-in-part of application No. 10/409,073, filed on Apr. 9, 2003, now Pat. No. 7,580,463.

(30) Foreign Application Priority Data

Apr. 9, 2002   (CA) .................................... 2380105

(51) Int. Cl.
*H04N 7/12* (2006.01)
*H04N 11/02* (2006.01)

(52) U.S. Cl. ................................................ 375/240.26

(58) Field of Classification Search ...............................
375/240.01–240.06, 240.12–240.16, 240.25–240.26; 348/42
See application file for complete search history.

(56) References Cited

U.S. PATENT DOCUMENTS

| 4,998,167 | A | | 3/1991 | Jaqua | |
|---|---|---|---|---|---|
| 5,262,854 | A | * | 11/1993 | Ng | ........................ 375/240.24 |
| 5,416,510 | A | * | 5/1995 | Lipton et al. | ................... 348/43 |
| 5,510,832 | A | | 4/1996 | Garcia | |
| 5,860,912 | A | * | 1/1999 | Chiba | .......................... 600/111 |
| 5,870,137 | A | * | 2/1999 | Stuettler | ....................... 348/51 |
| 5,933,547 | A | | 8/1999 | Dudon et al. | |

(Continued)

FOREIGN PATENT DOCUMENTS

EP   1024672   9/1998

(Continued)

*Primary Examiner*—David Czekaj
(74) *Attorney, Agent, or Firm*—Anglehart et al.

(57) ABSTRACT

A system is provided for processing a compressed image stream of a stereoscopic image stream, the compressed image stream having a plurality of frames in a first format, each frame consisting of a merged image comprising pixels sampled from a left image and pixels sampled from a right image. A receiver receives the compressed image stream and a decompressing module in communication with the receiver decompresses the compressed image stream. The left and right images of the decompressed image stream are stored in a frame buffer. A serializing unit reads pixels of the frames stored in the frame buffer and outputs a pixel stream comprising pixels of a left frame and pixels of a right frame. A stereoscopic image processor receives the pixel stream, buffers the pixels, performs interpolation in order to reconstruct pixels of the left and right images and outputs a reconstructed left pixel stream and a reconstructed right pixel stream, the reconstructed streams having a format different from the first format. A display signal generator receives the stereoscopic pixel stream to provide an output display signal.

18 Claims, 9 Drawing Sheets

U.S. PATENT DOCUMENTS

| | | | |
|---|---|---|---|
| 6,078,352 A * | 6/2000 | Nakaya et al. | 348/42 |
| 6,163,337 A * | 12/2000 | Azuma et al. | 348/43 |
| 6,192,079 B1 | 2/2001 | Sharma et al. | |
| 6,195,205 B1 | 2/2001 | Faris | |
| 6,285,368 B1 | 9/2001 | Sudo | |
| 6,618,437 B1 | 9/2003 | Yamamoto | |
| 6,765,568 B2 | 7/2004 | Swift et al. | |
| 7,180,554 B2 * | 2/2007 | Divelbiss et al. | 348/742 |
| 7,319,720 B2 * | 1/2008 | Abrams, Jr. | 375/240.12 |
| 2003/0128273 A1 * | 7/2003 | Matsui et al. | 348/51 |

FOREIGN PATENT DOCUMENTS

| | | |
|---|---|---|
| JP | 6169475 | 6/1994 |
| WO | 9743863 | 11/1997 |

* cited by examiner

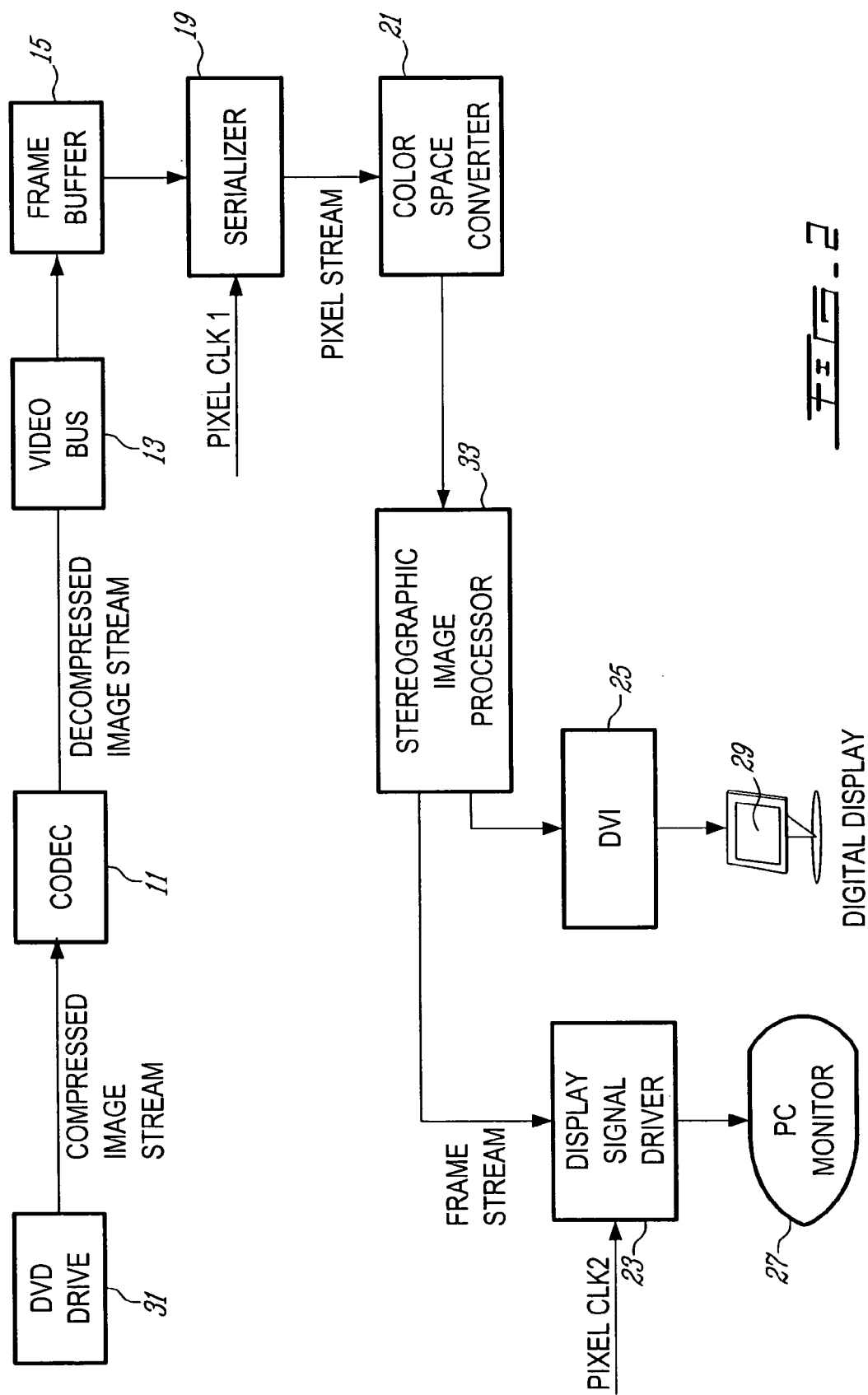

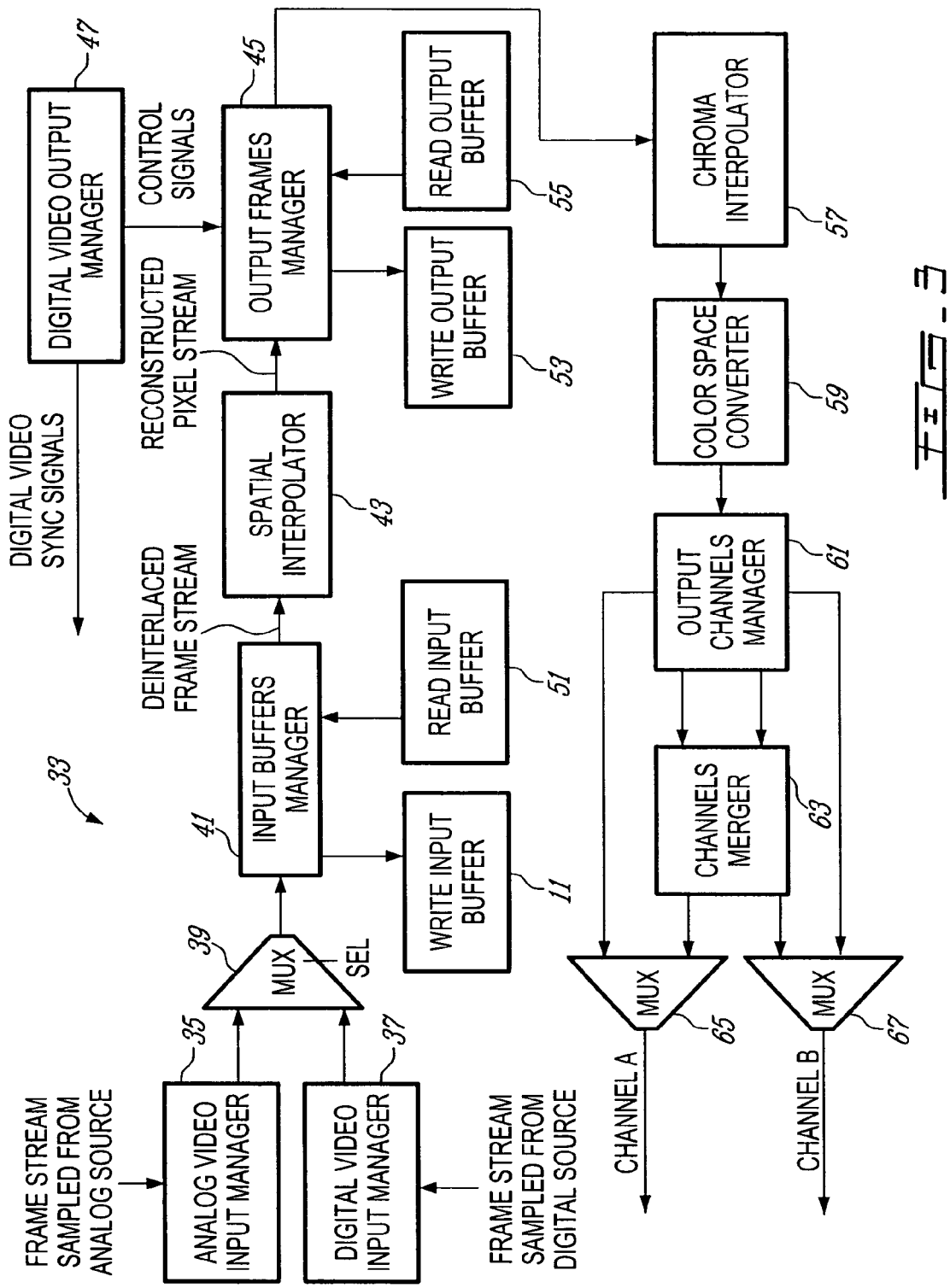

| pixel L-2 P+2 | pixel L-1 P+2 | pixel L P+2 | pixel L+1 P+2 | pixel L+2 P+2 |
|---|---|---|---|---|
| pixel L-2 P+1 | pixel L-1 P+1 | pixel L P+1 | pixel L+1 P+1 | pixel L+2 P+1 |
| pixel L-2 P | pixel L-1 P | pixel L P | pixel L+1 P | pixel L+2 P |
| pixel L-2 P-1 | pixel L-1 P-1 | pixel L P-1 | pixel L+1 P-1 | pixel L+2 P-1 |
| pixel L-2 P-2 | pixel L-1 P-2 | pixel L P-2 | pixel L+1 P-2 | pixel L+2 P-2 |

FIG. 4A

|  | pixel L-1 P+2 |  | pixel L+1 P+2 |  |
|---|---|---|---|---|
| pixel L-2 P+1 |  | pixel L P+1 |  | pixel L+2 P+1 |
|  | pixel L-1 P |  | pixel L+1 P |  |
| pixel L-2 P-1 |  | pixel L P-1 |  | pixel L+2 P-1 |
|  | pixel L-1 P-2 |  | pixel L+1 P-2 |  |

FIG. 4B

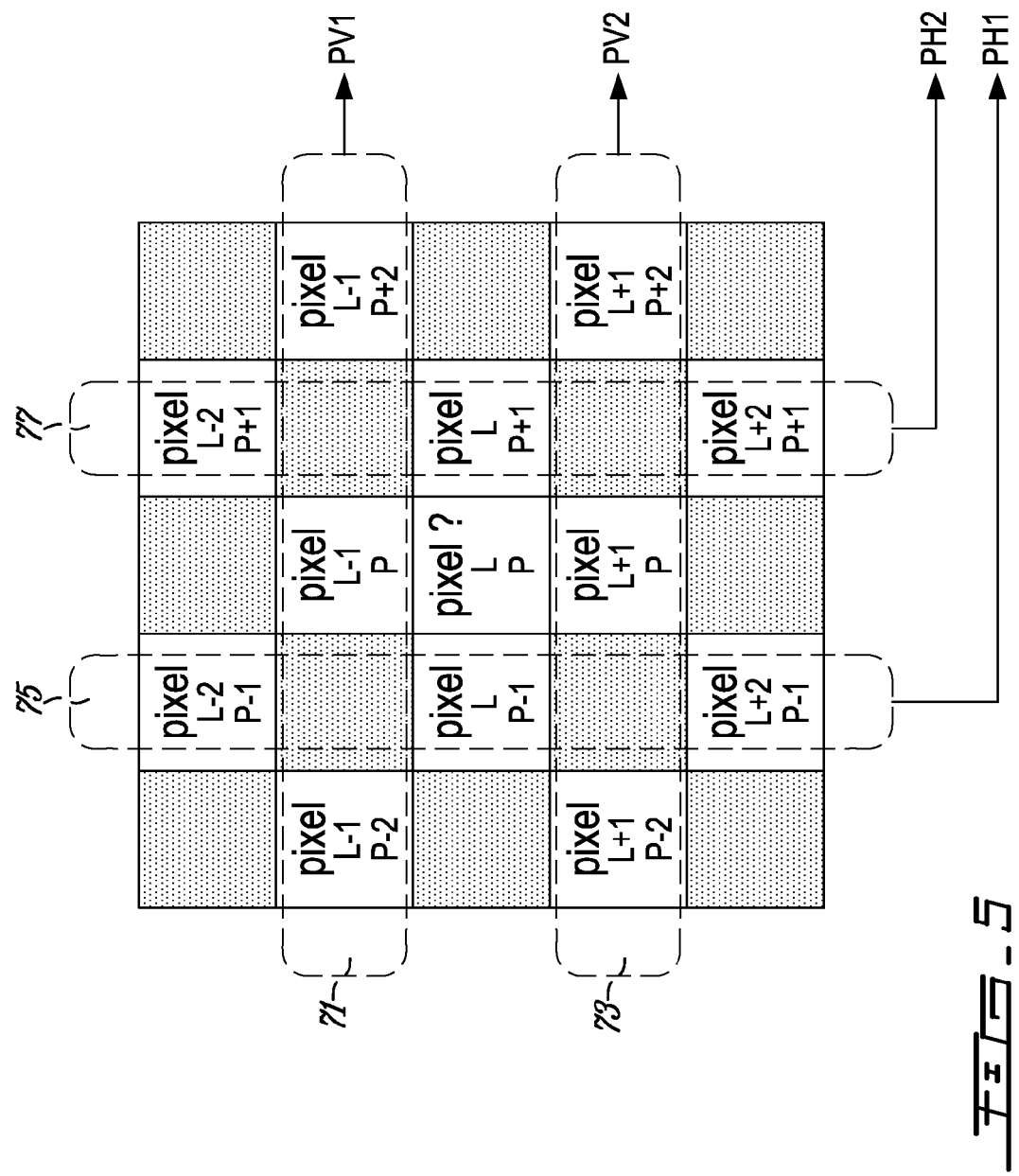

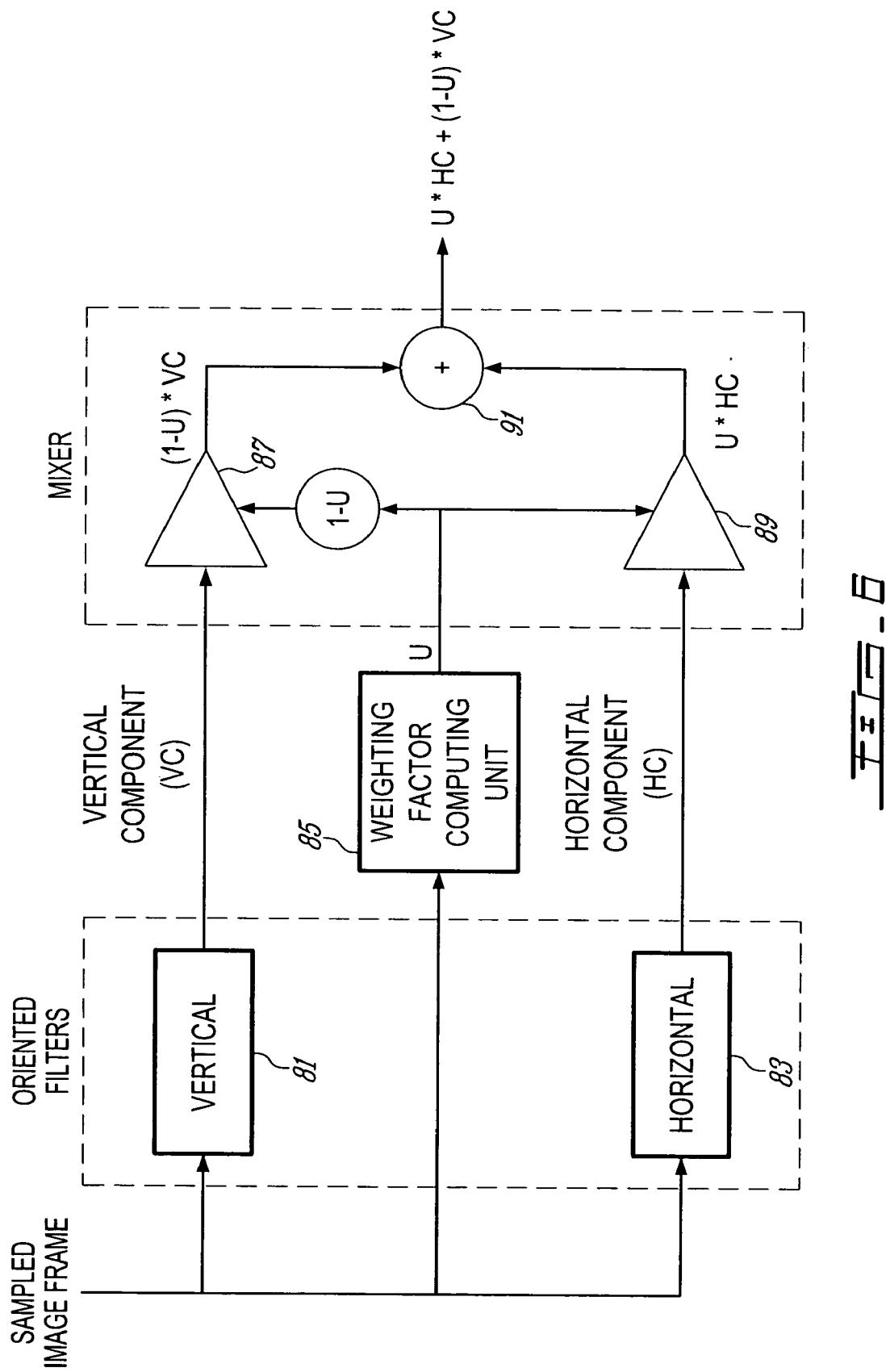

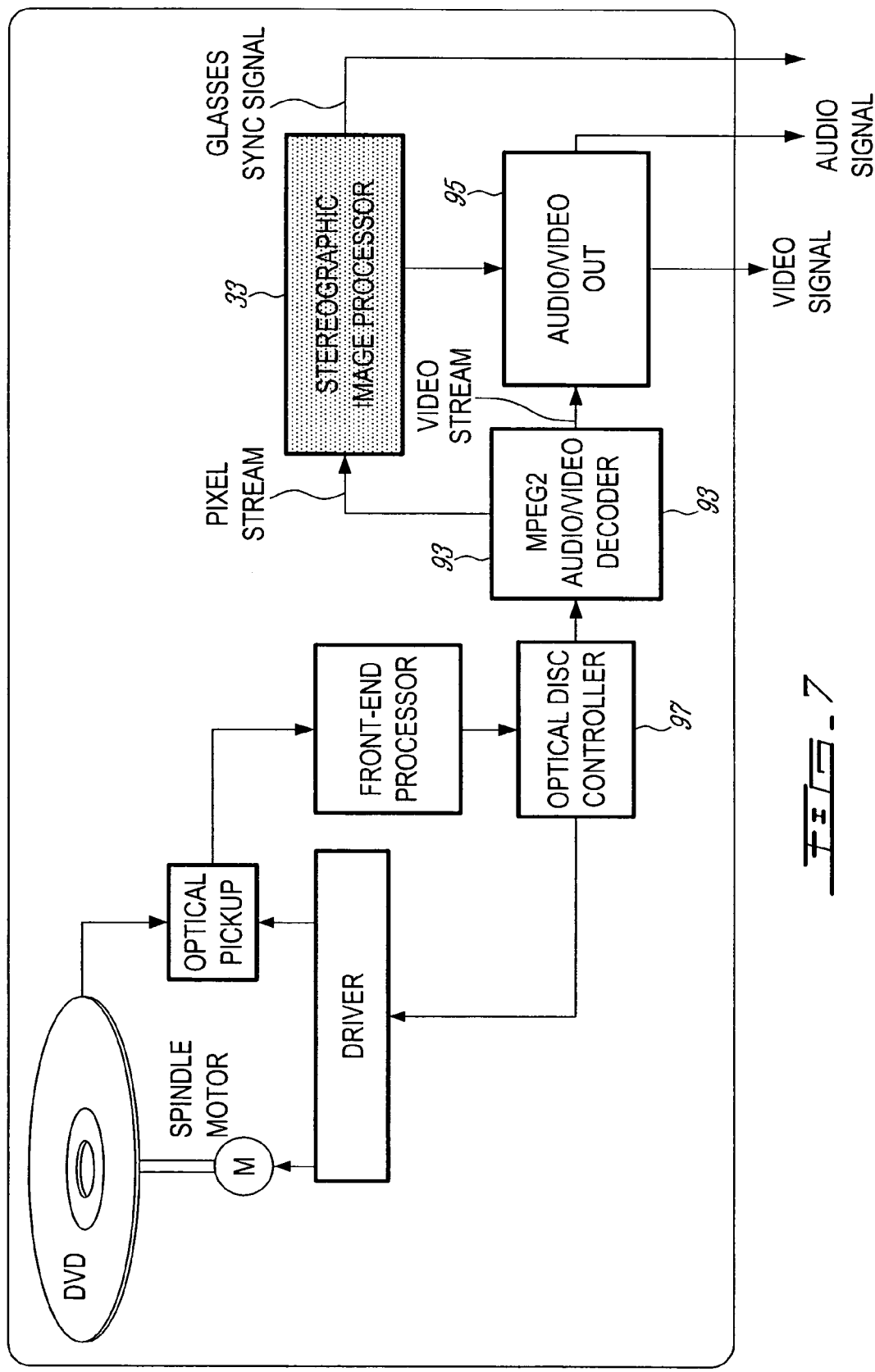

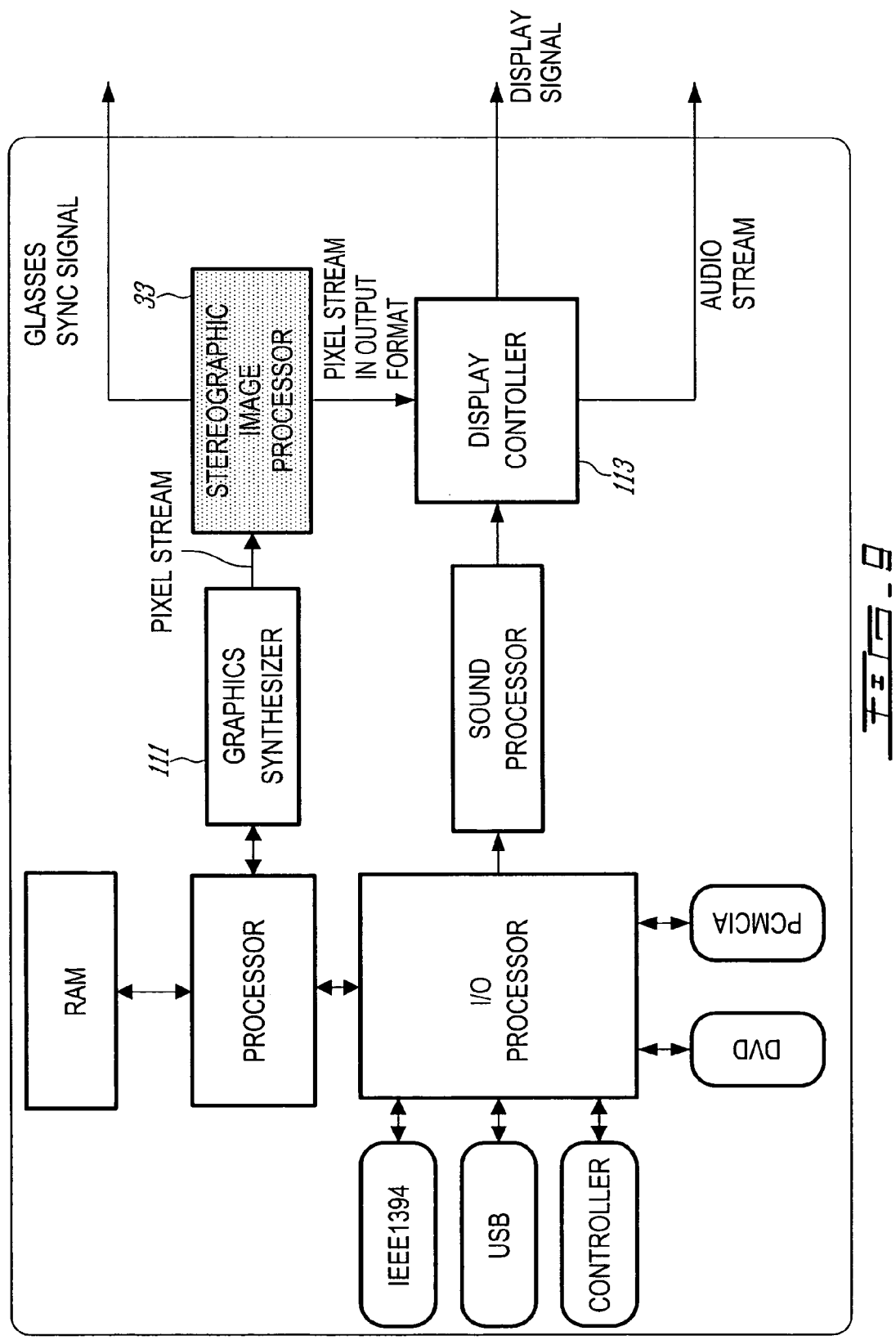

APPARATUS FOR PROCESSING A STEREOSCOPIC IMAGE STREAM

CROSS-REFERENCE TO RELATED APPLICATIONS

The application is a Continuation-In-Part of U.S. patent application Ser. No. 10/409,073, filed Apr. 9, 2003, now U.S. Pat. No. 7,580,463, the specification of which is hereby incorporated by reference.

FIELD OF THE INVENTION

The invention relates to a process and system for encoding and decoding a dual program image sequence, and, more particularly, to a process and system for compressing two image sequence signals on a single video signal and decoding said single video signal to reproduce two image sequence programs or a three-dimensional stereoscopic program in multiple viewing formats.

BACKGROUND OF THE INVENTION

Since the invention of the stereoscope in 1947, several systems have been developed to enable a viewer to view three-dimensional (3D) programs through the reproduction of a first image sequence intended for viewing by the viewer's left eye and a second sequence of images of the same scene and at the same time but with a parallax with respect to the first image sequence, intended to be viewed exclusively by the viewer's right eye, thereby replicating the principles of natural three-dimensional vision. Since the 1950s, many films have been made using dual camera head system's to pick up stereo pairs of images in time synchronism and with a parallax to enable a viewer at reproduction to perceive the effect of depth, so to provide a more complete and exciting viewing experience.

At present, home theatre systems are rapidly penetrating the household market and very sophisticated and high quality systems are gaining in popularity, responding to a need for a high quality cinematographic experience at home.

Nevertheless, existing stereoscopic reproduction systems are still far from fulfilling the expectations of viewers and are still not integrated into even the most advanced home theatre systems available. The reason mostly lies on the relatively poor image quality (fade colours and/or stair-stepping diagonals) and the fatigue and discomfort caused by the usual flicking and lack of spatial realism. Indeed, since two different programs are being presented with equipment intended for single video program presentation, such as a television set, sharing of the technical resources between two video signals leads to loss of image spatial resolution and flicking due to the reduction by half of the frame presentation rate for each eye and contrast between image fields and a black background.

A typical existing stereoscopic reproduction technology consists in encoding the first image sequence information in the even line field of an interlaced video signal and the information of the second image sequence in the odd line field of the signal. At playback, shutter spectacles are used to block one of the viewer's eyes during presentation of the even lines and the other eye during presentation of the odd lines. As normal images comprising even and odd lines are typically presented in two successive scan periods of ⅟60 s, each eye sees the stereoscopic program as a sequence of ⅟60 s images followed by ⅟60 s blackout periods, to enable each eye to view 30 frames per second (fps). Moreover, each reproduced image is constituted by alternating image lines and black lines. Obviously, the stereoscopic images so, reproduced lose half of their topological information and the 50% duty cycles (both in space and in time) induce loss of brightness and flicking, as confirmed by experience.

A solution to such limitations, shortcomings and drawbacks, is to present complete stereoscopic images at a rate of at least 60 fps (30 full frames per second per eye), which would normally require at least twice the signal bandwidth required by a non-stereo (planar) program. Elimination of flicking in a room presenting relatively high contrast between the displayed pictures and lo ambient lighting, further requires a vertical scan (and shutter spectacle) frequency of up to 120 Hz, to enable presentation of up to 60 full definition images per second to each eye. While such a frequency is not widely available, flickerless presentation of stereoscopic program can be set up by using two digital video projectors of current manufacture, receiving respectively a first and a second image sequence of the stereoscopic program at a continuous rate of 30 fps each. The output of each projector is optically filtered to produce a vertically and a horizontally polarized output projecting images in register and in perfect time synchronism on a special silver coated screen. Eyewear comprising differently polarized glasses can be worn by a viewer to reveal the three dimensional effects. Such a solution is obviously very expensive and does not meet market expectations for a home theatre system.

However, very fast and relatively affordable projectors using the DLP (Digital Light Processing) technology are now available that could provide a presentation rate up to 120 fps, so that a single projector could alternatively present images of stereo pair sequences at a sufficiently high rate to substantially eliminate flicking even in a high contrast environment. Also, high-end CRT projectors and computer monitors could provide such a compatible definition and refresh rate.

Nevertheless, a major limitation of such systems remains that most current standards for storage and broadcast (transport) of video program information limit the flow of full frame images to 30 fps, which is approximately half of the capacity required to store and present a high quality stereoscopic program originally comprised of two 24 (American Motion Picture), 25 (PAL or SECAM) or 30 fps (NTSC Video) programs. Furthermore, since motion picture movies are always captured and recorded at a rate of 24 frames per second, the dual problem of compressing two 24 fps programs into a single 30 fps signal and thereafter expanding such a signal to present the two programs at a rate of 30 to lo 60 fps each must be addressed. Therefore, the future of the 3D home theatre lies on the capacity to encode and decode a stereoscopic video signal to comply width standard recorders, players and broadcast equipment of present manufacture treating a 30 fps signal compressed and decompressed using a protocol such as MPEG-1 or MPEG-2 (Moving Picture Image Coding Group) compression/decompression protocol of the MAIN profile (vs MVP), so that negligible loss of information or distortion is induced throughout the process.

A few technologies of the prior art have taught solutions to overcome one or more of the above-mentioned shortcomings and limitations. Firstly, the 3:2 pull down compression method can be used to create a 30 fps stereoscopic interlaced signal from a 24 fps interlaced picture sequence. With this method the original image sequence is time-expanded by creating and inserting one new picture after every four pictures of the original sequence. The new picture comprises the even lines of the preceding picture in one field and the odd lines of the next picture in its second field. Obviously, each picture of the original program may be comprised of a first field comprising a portion of a left view image and a second field comprising a portion of a right view image of a stereoscopic program. A 30 fps stereoscopic program can thereby be obtained from a 24 fps left eye sequence and a 24 fps right eye sequence. With such a technique however, the resulting 30 fps program presents anachronism and topological distortion due to the combination in certain pictures of lines belonging to images captured at different times. This yields a poor result, lacking in realism and causing eye fatigue and discomfort to the viewer. When used to present a stereoscopic program, this technique further suffers from the same limitations and drawbacks as discussed hereinabove about the interlaced signal compression technique.

Furthermore, many stereoscopic display devices have been developed using different input signals incompatible with one another and requiring different lo transport (storage or distribution) formats (column interleaved, row interleaved, simultaneous dual presentation, page flipping, anaglyphic, etc.). A solution to bring a stereoscopic video program to different systems at the same time while allowing for 2D viewing would be to simultaneously broadcast or store on several physical media in all the existing formats. Obviously, that would neither be practical nor economical. Therefore, the future of stereoscopic video at home requires a stereoscopic video signal and a video processing apparatus that have the ability to generate multiple/universal stereoscopic output formats compatible with current and future stereoscopic display devices while allowing for normal 2D viewing.

Many patents also teach compression techniques to reduce two 30 fps signals to be carried through a single channel with a 30 fps capacity, some of them being designed to be transparent for the MPEG compression/decompression process. However, these techniques do not feature temporal interpolation as needed to create the missing frames to convert for instance a 24 fps sequence to 30 fps, or to convert a 30 fps sequence to a 48, 60, 72, 96 or 120 fps sequence, while preserving image quality and providing a comfortable viewing experience. Furthermore, they do not have the ability to generate multiple stereoscopic output formats from the same video signal and video processing apparatus.

For instance, U.S. Pat. No. 5,626,582 granted to Muramoto et al. on May 6, 1997, teaches a time-based compression method in which two 30 fps video signals are digitized and stored In DRAM memory at a given clock frequency.

Subsequently, the memory is read at twice that write frequency so that two samples of an original period of 1/30 can be concatenated in a 1/30 interval.

However, depending on the selected sampling frequency, the final signal will either lack definition because the information of two adjacent pixels will be averaged in a single digital data (low sampling frequency and normal playback frequency), or exceed the capacity of a data storage medium such as a DVD or lo a broadcast channel. This invention also lacks the ability to generate multiple output formats from a given source format, and requires two parallel circuits for reconstruction of the original sequences.

Further, in International application No WO 97/43863, by Briede, laid open on Nov. 20, 1997, images from a first and a second sequence of images are decimated and pixels are redirected to form a single line with the complementary pixels of two successive original lines and then interlacing the newly created lines from the left eye and the right eye to form a combined stereo image sequence to be transmitted through a channel. At the receiving end, the juxtaposed fields are demultiplexed from the stereo image sequence and are sent to two parallel expanding circuits that simultaneously reposition the pixels and recreate the missing picture elements of their respective stereoscopic video sequence (right and left).

The thereby reconstructed original first and second images sequences are then outputted to two displays for visualization.

While that technology provides an interesting method for spatially compressing/decompressing full frames, for storage or distribution using a limited capacity channel (transport medium), it does not address the problem of converting a two 24 or 25 fps image sequences into a 30 fps stereo sequence or boosting the playback rate to prevent flicking. Furthermore, it does not allow playback in other stereoscopic formats, including the page flipping mode using a single display monitor or projector through time sequencing of the rebuilt first and second image sequences. Also, as for the previous example, two parallel circuits are again required to carry out the reconstruction process on both image sequences since the signal must be originally first demultiplexed before reconstructing the images.

Additionally, prior art systems use one of several known interpolation algorithms in order to reconstruct missing pixel values that have been lost by sampling of stereoscopic image frame. Examples of such algorithms are nearest neighbor interpolation, that directly applies data from the neighboring pixels to recreate the missing pixel. Unfortunately, such an algorithm produces diagonal line artifacts which result in a deteriorated reconstructed image. Another interpolation method is the bilinear interpolation which calculates a product-sum of the neighboring pixels. While this algorithm provides improved results over the nearest neighbor algorithm, it is suitable to recreate only image areas that have smooth changes. For image areas containing edges, the algorithm causes unclearness and loss of sharpness and density differences and is therefore not suitable.

There exists therefore a need for an edge-sensitive algorithm allowing to reconstruct a sampled stereoscopic image frame with superior quality.

Although the above examples show that different methods and systems are known for the encoding of two video signals or images sequences into a single lo signal and for decoding such a composite signal to substantially retrieve the original signals or sequences, these methods and systems of the prior art are nevertheless lacking important features to provide a functional system which enables high fidelity recording, broadcast and playback of two 24 fps motion picture movies as well as 25 or 30 fps stereoscopic video programs, using a single channel and conventional recording, playback and display equipment of present manufacture, as required for instance to meet the expectations of the home theatre market for 3D movies reproduction.

There is thus a need for a stereoscopic program playback method and system which can be readily used with existing home theatre equipment to provide a high quality stereoscopic reproduction, still at an affordable cost, while enabling playback of a specific stereoscopic video transport signal in a plurality of output formats.

Incorporation by reference is made herein to the following documents.

SUMMARY OF THE INVENTION

Accordingly, an object of the present invention is to provide a playback method and system which enable high visual quality reproduction of stereoscopic programs by reconstruction of the original sequences and rate augmentation for presentation at rates from 24 to 60 full resolution images per second per eye, in progressive or interlaced mode.

Another object of the present invention is to provide an encoding and playback method and system which features full compatibility with commercially available data storage medium playback equipment and display equipment, and more specifically with MPEG main view profile compression/decompression protocols and commercial circuits.

Another object of the present invention is to provide a stereoscopic program playback system which generates universal output signals which can be directly used or converted to enable reproduction with any existing technology such as head mounted displays (HMD), LCD, DLP and CRT rear and front projection TV's, direct view TV's, computer monitors, autostereoscopic displays or any future stereoscopic display operating under any universal standard (NTSC, PAL, SECAM, SDTV, HDTV, etc.), with shutter spectacles, polarized eyewear, or anaglyphic glasses.

Yet another object of the present invention is to provide a playback system which provides elimination or substantial reduction of flicking and fatigue usually encountered in viewing stereoscopic movies with the prior art methods and apparatus.

According to a first broad aspect of the present invention, there is provided a system for processing a compressed image stream of a stereoscopic image stream, the compressed image stream having a plurality of frames in a first format, each frame consisting of a merged image comprising pixels sampled from a left image and pixels sampled from a right image. The system comprises a receiver for receiving the compressed image stream; a decompressing module in communication with the receiver for decompressing the compressed image stream; a frame buffer connected to the decompressing module for receiving and storing left and right image frames of the decompressed image stream; a serializing unit for reading pixels of the frames stored in the frame buffer and outputting a pixel stream comprising pixels of a left frame and pixels of a right frame; a stereoscopic image processor receiving the pixel stream, buffering the pixels, performing interpolation in order to reconstruct pixels of the left and right images and outputting a reconstructed left pixel stream and a reconstructed right pixel stream, the reconstructed streams having a format different from the first format; and a display signal generator receiving the stereoscopic pixel stream to provide an output display signal.

According to a second broad aspect of the present invention, there is provided a system for transmitting stereoscopic left and right image frames, a left image frame and a right image frame forming a pair, comprising: for each of the left and right image frames, sampling the image frame such that the sampled image frame has half a number of original pixels forming a staggered quincunx pattern, wherein the original pixels surround missing pixels; for each left and right image frame pair, creating a new frame by juxtaposing a sampled image frame of a left image and a sampled image frame of a right image; transmitting the new frames in an image stream; receiving the image stream of new frames; reconstructing the stereoscopic left and right image frames by interpolating missing pixel values for each image frame, using only the original pixels, wherein the interpolating comprises, for each missing pixel: calculating an edge-dependent weighting factor using the original pixel values including values of original pixels other than the original pixels immediately surrounding the missing pixel; and calculating an interpolated value for the missing pixel using original pixels and the weighting factor.

BRIEF DESCRIPTION OF THE DRAWINGS

These and other features, aspects and advantages of the present invention will become better understood with regard to the following description and accompanying drawings wherein:

FIG. 2 is a block diagram of a computer architecture according to one embodiment of the present invention for processing a compressed image stream;

FIG. 3 is a block diagram of a stereoscopic image processor system according to the preferred embodiment of the present invention;

FIG. 4A is an image frame before sampling;

FIG. 4B is a sampled image frame after quincunx sampling;

FIG. 5 is a sampled image frame in which missing pixel (L,P) is reconstructed;

FIG. 6 is a block diagram of a system for reconstructing missing pixels in a sampled image frame;

FIG. 7 is block diagram of a DVD player system using the stereoscopic image processor system of the present invention;

FIG. 9 is a block diagram of a gaming console using the stereoscopic image processor system of the present invention.

DETAILED DESCRIPTION OF THE PREFERRED EMBODIMENT

Figure 1:
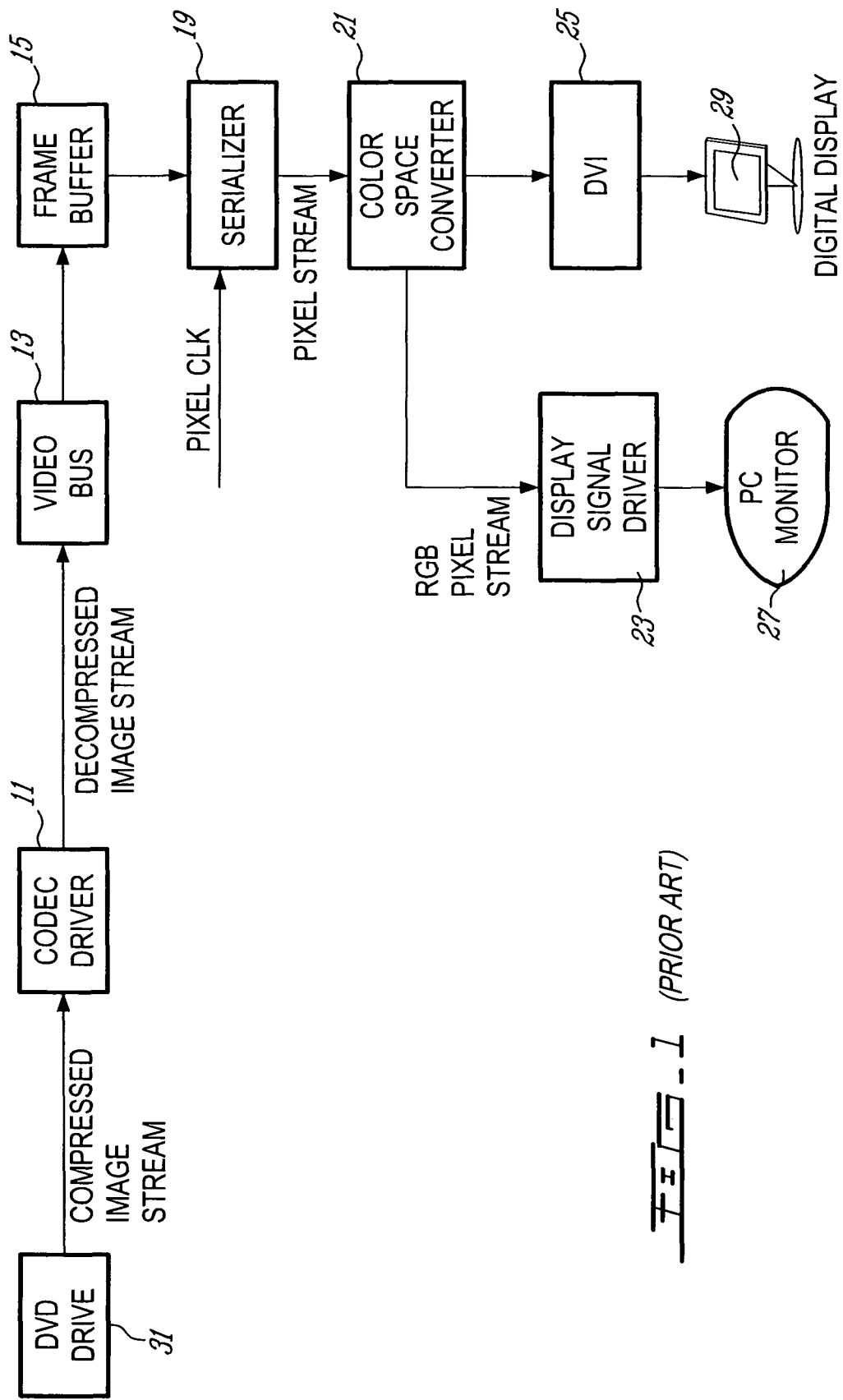
FIG. 1 is a block diagram of a prior art computer architecture for processing a compressed image stream.

With respect to FIG. 1, a block diagram of a prior art computer architecture system will now be described. In prior art systems, a received compressed image stream, received from a DVD reader 31, for example, is provided to a codec driver 11, for decompression. The codec driver 11 sends the decompressed image stream through the video bus 13 to a frame buffer 15. A serializing unit 19 reads pixels from the frame buffer and outputs into a pixel stream, at a rate given by a pixel clock. The pixel stream is received by a color space converter 21, which performs the necessary color space conversions, such that the pixel stream is in the appropriate display format. For example, in the case in which the pixel stream is to be output on a PC monitor 27, the pixel stream is in RGB format. The pixel stream is then, for example, either sent to a display signal driver 23 or to a DVI driver 25 to be formatted for display.

In one embodiment of the present invention shown in FIG. 2, The stereo DVD (3DVD) comprising the compressed information from left and right image sequences, is read by a DVD drive 31, and a compressed image stream is provided to a codec module 11. The codec module decompresses the image stream and sends it over the video bus 13 to be processed. The frame images of the image stream are stored in a frame buffer 15 from where a serializing unit 19 driven by a pixel clock reads out a pixel stream.

In one embodiment of the present invention shown in FIG. 2, the pixel clock driving the serializing unit and the pixel clock of the display signal driver are the same. The stereoscopic image processor 33 receives the pixels of the pixel stream at the rate of the pixel clock, but outputs them with a delay. The delay is a full frame delay in the case in which the SIP 33 processes a full image frame or an n-line delay in the case in which the SIP 33 performs pixel interpolation by using n-lines at a time. In the preferred embodiment of the present invention, n is at least 5. This is the case when the output is, for example, anaglyphic, 2D or if SIP 33 acts as a pass-through for non stereoscopic pixel streams.

In another embodiment of the present invention, in the case in which the SIP 33 changes the display rate of the output in order to match that of a display device, the pixel clock of the display signal driver and that of the SIP 33 are the same, but they are different from the pixel clock of the serializing unit 19.

The pixel stream is then fed to a color space converter 21 for color space conversion, as previously described. According to the present invention, in the next step, the pixel stream is provided to the stereoscopic image processor SIP 33 for processing such that it may be displayed in one of a plurality of output formats.

The SIP 33 can produce a synchronized pair of RGB signals as outputs, representative of the first and second image sequences, to drive a dual input stereoscopic progressive display device such as a head mounted display (HMD). Further, similarly the SIP 33 could produce a time-sequenced stereo RGB signal, to supply a single input progressive display device such as projector. LCD display 27, CRT monitor or a SDTV or HDTV 29, whereby images from the first and second image sequences are presented in an alternating page flipping mode. Alternatively, the stereo RGB signal from the output may be converted into an interlaced NTSC signal to be reproduced by an analog CRT television set or in any other stereoscopic formats (ex: column interleaved for autostereoscopic lenticular displays).

The SIP 33 further produces a sync-timing signal to drive an infrared (IR) shutter spectacle driver, driving shutter glasses. While in the preferred embodiment of the present invention an IR emitter is used, in alternative embodiments, a radio frequency (RF) emitter or a wire connection could be used. The shutter glasses can be worn by a viewer to view a three-dimensional program projected for instance on a screen by projector fed by a dual RGB pixel stream output. The shutter glasses work by enabling the viewer to alternately see an image from the first image sequence with one eye and an image from the second image sequence with his second eye.

FIG. 3 illustrates the stereoscopic image processor SIP 33 according to the preferred embodiment of the present invention. While the SIP 33 processes only digital signals, it differentiates between two possible input types: digital pixel streams that have been sampled from analog sources and "purely" digital frame streams. An analog video input manager 35 receives the pixel streams sampled from analog sources, containing header and code information, such as active video and blanking intervals. The analog video input manager 35 strips away the information which is not useful to the SIP 33 and provides a simplified pixel stream. Similarly, the digital video input manager 37 is designed to handle pixel streams originating from a digital source. The digital video input manager 37 provides a pixel stream which does not contain information regarding the original source. A multiplexer unit 39 receives both types of streams and a select line indicates which one to output, depending on the configuration of the SIP 33 module.

The input buffers manager 41 receives the pixel stream selected by the multiplexer unit 39. The input buffers manager 41 buffers the incoming pixel stream by writing it to an input buffer 49. When a complete frame is received, the contents of the write input buffer 49 are switched to a read input buffer 51, from which it is output.

The input buffer manager 41 is important especially for pixel streams which are received interlaced. For such pixel streams, all even lines are received before odd lines, which is inconvenient from the point of view of stereoscopic processing. The de-interlace module of the input buffers manager 41 buffers the even lines, and then, as it receives odd lines, it alternates writing an even and an odd line to the write input buffer 49, so that a progressive frame is stored.

The de-interlaced frames output from the read input buffer 51 are sent to the spatial interpolator 43 module of the SIP 33. The received frames are in a special format, each frame containing half the pixels of an original left frame and half the pixels of an original right frame, which were mixed when the video source was created. The spatial interpolator 43 is used to reconstruct the original left and right frames. (page 19-20)

The spatial interpolator 43 interpolates missing pixels using interpolation method, whose accuracy affects the quality of the reconstructed frames. The interpolation method of the preferred embodiment of the present invention will now be described.

A reconstructed frame, at the end of the interpolation method, will contain half original pixels and half interpolated pixels. According to the interpolation method of the preferred embodiment of the present invention, the interpolated pixels are created only from values of original pixels.

FIG. 4A shows an image frame according to the present invention, with original pixels arranged in rows and columns, before any sampling has been performed. In FIG. 4B, the sampled image frame is shown after the image has been sampled in quincunx pattern. Quincunx sampling, as it is well-known to those skilled in the art, is a sampling method by which sampling of odd pixels alternates with sampling of even pixels for consecutive rows, such that the sampled pixels form a checkerboard pattern.

FIGS. 4A, 4B and 5, L designates the vertical position of a pixel in terms of line number and P designates the horizontal position of a pixel, in terms of pixel number/line, with reference to a central pixel (P,L), which is a missing pixel whose value needs to be reconstructed.

As it can be seen in FIG. 4B, in the first row of the sampled image, pixels at position (L−2, P−2), (L−2, P) and (L−2, P+2) have been discarded and the original pixels at (L−2, P−1) and (L−2, P+1) have been sampled. In the row right below, the pixels at (L−1, P−1) and (L−1, P+1) have been discarded and the original pixels at (L−1, P−2), (L−1, P) and (L−1, P+2) have been sampled.

The pixel interpolation method of the present invention relies on the fact that the value of a missing pixel is related to the value of original neighboring pixels. The values of original neighboring pixels can therefore be used in order to reconstruct missing pixel values. The present algorithm reconstructs the value of a missing pixel by using a weighting of a horizontal component (HC) and a weighting of a vertical component (VC) collected from neighboring pixels. For example, given a weighting factor U, with $0<=U<=1$, the equation implemented by the present invention is as follows:

$$\text{Missing pixel value} = U*HC + (1-U)*VC$$

We notice that the larger U, the larger will be the weight of the horizontal component in the overall pixel value and inversely, the smaller U, the larger will be the weight of the vertical component in the overall pixel value.

The weighting factor U that will dictate the relative proportions of horizontal and vertical information is an edge-dependent parameter. U is a weighting factor which is a measure of the level of change of horizontal content, relative to the level of change of vertical content. In order to calculate the weighting factor U, a horizontal change parameter, DPH, is first calculated according to the following equation:

$$DPH=(PH2-PH1)^2$$

Where PH2 is calculated by adding the weighted original pixel values in column 77, which is the column immediately to the right of the missing pixel. Similarly, PH1 is calculated by adding the weighted original pixel values in column 75, which is the column immediately to the left of the missing pixel.

In the preferred embodiment of the present invention, the formulas for calculating PH2 and PH1 are:

$$PH2=0.25*(L-2,P-1)+0.5*(L,P-1)+0.25*(L+2,P-1)$$

and $$PH1=0.25*(L-2,P+1)+0.5*(L,P+1)+0.25*(L+2,P+1).$$

It is to be understood, however, that different coefficients may be used for the calculations of PH2 and PH1.

PH2 and $PH_1$ are then used to calculate the horizontal change parameter DPH, as per the equation above.

In a next step, the vertical change parameter DPV is calculated, according to the equation:

$$DPV=(PV2-PV1)^2$$

PV1 and PV2, are calculated by adding the weighted original pixel values in row 71, which is the row immediately above of the missing pixel. Similarly, PV2 is calculated by adding the weighted original pixel values in row 73, which is the row immediately below of the missing pixel.

The equations for PV1 and PV2 are as follows in the preferred embodiment of the present invention:

$$PV2=0.25*(L+1,P-2)+0.5*(L+1,P)+0.25*(L+1,P+2)$$

and $$PV1=0.25*(L-1,P-2)+0.5(L-1,P)+0.25*(L-1,P+2).$$

It is to be understood, however, that different coefficients may be used for the calculations of PV2 and PV1.

Once DPH and DPV are calculated, U can be computed using the following equation:

$$U=(DPH+1)/(DPH+DPV+2)$$

Analysis of the expression for U shows that, in the case in which the horizontal change parameter DPH is much larger than DPV, U will have a value close to 1, which, in the missing pixel value equation, will mean that the horizontal component HC will have most of the weight and the vertical component VC will be almost negligible. In the case in which DPV is much larger than DPH, the value of U will be close to 0, which, in the missing pixel value equation will mean that the vertical component VC will have the most weight and that the horizontal component HC will be almost negligible. In the case in which the values of DPV and DPH are comparable, the value of U is ½, which gives equal weight to the horizontal and vertical components.

The last step before computing the missing pixel value is to calculate the horizontal component HC and the vertical component VC. In the preferred embodiment of the present invention, HC is calculated by taking the arithmetic mean of the neighboring original pixel right above the missing pixel, in the example of FIG. 5, (L−1, P), and the neighboring original pixel right below the missing pixel, (L+1, P), all pixels being located along the same vertical line. Similarly, the vertical component VC is calculated by taking the arithmetic mean of the neighboring original pixel to the right of the missing pixel, (L, P+1) and (L, P−1).

In other embodiments of the present invention, additional pixels might be used for calculating HC, such as, for example, pixel (L−3, P) and (L+3, P). Similarly, for calculating VC, other original pixels to the left and the right might be used, such as, (L, P−3) and (L, P+3). In the case that more than 2 pixels are used for computing horizontal and vertical components, horizontal and vertical filters, such as Finite Impulse Response (FIR) filters, are used in order to determine the coefficients of the original pixels used. Preferably, the same filter coefficients are used for the vertical and the horizontal component calculations.

FIG. 6 illustrates a block diagram of a system for interpolating missing pixel values of a sampled image. The sampled image frame, in our case, only 5 lines at a time are needed for interpolating a given missing pixel, is received at the vertical filter 81, the horizontal filter 83, as well as the weighting factor computing unit 85. The vertical filter, using the equations described above, will output a vertical component VC, the horizontal filter will output the horizontal component HC, while the weighting factor computing unit 85 will output the edge-dependent weighting factor 85. A multiplication unit 87, multiplies VC by the "1-U" factor and another multiplication unit 89, multiplies HC by the U factor. The results of the two multiplication are added by adder 91 to provide the missing pixel value.

In an alternative embodiment of the present invention, the interpolation method is as follows. In a first step, the pixels along the same horizontal line as the missing pixel are scanned in order to detect a horizontal edge sensitivity parameter, which is a measure of the horizontal edge direction. Then, values of original pixels neighboring the missing pixel to the left and to the right along the same horizontal line, together with the horizontal edge sensitivity parameter, are used to calculate weighting coefficients.

While in one embodiment of the present invention in order to calculate the weighting coefficients for interpolating a missing pixel, pixels (L, P−3), (L, P−1), (L, P+1) and (L, P+3) are used, additional pixels along the same horizontal line may be used for improved accuracy.

The weighting coefficients and the values of the original pixels are then used to calculate a horizontal intermediate pixel value. In the preferred embodiment of the present invention, only the original neighboring pixels immediately to the left and to the right of the missing pixel are used for the computation of the horizontal intermediate pixel value. However, in other embodiments of the present invention, additional neighboring pixels to the left and to the right may be used.

Next, the pixels along the same vertical line as the missing pixel are scanned in order to detect a vertical edge sensitivity parameter. The vertical edge sensitivity parameter and the values of the original pixels neighboring the missing pixel above and below along the same vertical line, are used to calculate vertical weighting coefficients.

Then, the values of the original pixels, directly above and below the missing pixel are used, together with the vertical weighting coefficients, to compute a vertical intermediate pixel value.

After both the horizontal and vertical intermediate pixel values have been computed, the missing pixel is computed by taking the mean of the two intermediate values. Alternatively, the missing pixel value may be calculated by using the weighting factors together with the two intermediate values.

The steps outlined above are repeated for all missing pixels within a frame, such that, at the end of the interpolation process for a given frame, out of the total number of pixels, there are half original pixels and half interpolated pixels. The spatial interpolator 43 repeats the process for each left and right image frame of the image stream.

The reconstructed frames are then sent out as a pixel stream to the output frame manager 45. The output frame manager 45 writes received frames into the write output buffer 53 and reads frames from the read output buffer 55. The role of the output frame manager 45 and of the buffers 53, 55 is to provide image frames at the appropriate frame rate and in the appropriate display mode. The output of the output frames manager 45 is a pixel stream of reconstructed left and right frames at a chosen frame rate and in a given display mode.

The write output buffer 53 holds a complete pair of a reconstructed stereoscopic left image and its corresponding reconstructed stereoscopic right image. Whenever a complete pair of frames has been received from the spatial interpolator 33, the contents of the write output buffer 53 are switched to the read output buffer 55.

The write output buffer 53 and the read output buffer 55 are under the control of the output frames manager 45. The output frames manager receives control signals from a digital video output manager 47 concerning how to write to and read from buffers 53, 55, as well as at what rate, depending on the output format (e.g. page flip, dual stream, merged channels, etc.) wanted.

The digital video output manager 47 or output module, contains a display mode controller which selects one of a plurality of stereoscopic display modes and formats the image frames to be in the selected display mode. The digital video output manager 47 also contains a display rate controller for controlling the display rate of the image frames. The digital video output manager 47 sends control signals to the output frames manager 45 specifying a selected display mode and a display rate. The digital video output manager 47 also provides synchronization signals, such as v-sync, h-sync, blanking interval and glasses sync signal (if shutter glasses are used).

The output frames manager 45 is responsible for any time interpolation that might be needed in order to provide the display rate appropriate to the stereoscopic display technology used.

In order to enable comfortable and fatigue free viewing, SIP 33 reduces flicker by providing output signals at a higher rate than the original. Therefore, formatting process carried out by SIP 33 preferably includes a further step to increase the presentation rate of image frames. Additional image frames are inserted at regular intervals in the image sequence, using the temporal interpolation technique already explained in the foregoing description of the co-pending U.S. application. Alternatively, image frames from the left and right image sequences can be repeated (read twice) to increase the rate at presentation. For instance every image of the sequences could be read twice to double the rate of presentation.

It is also contemplated in the present invention that the RGB combined stereo output signal could be converted to another known standard presentation format such as an interlaced format or a conventional mono (2D) format.

The pixel stream is then sent to a chroma interpolator module 57, which processes pixel groups in order to reconstruct chroma information for each pixel, if needed. For example, if the original pixel stream is in 4:2:2 format and an anaglyphic output is needed, then the chroma interpolator reconstructs the missing chroma information in order to create a pixel stream in the 4:4:4 format. Since the anaglyph algorithm used In the preferred embodiment of the present invention requires a complete chroma information for each pixel, the channels merger 63 will request that the pixel stream arrives in this format.

For other algorithms however, such as the algorithm for producing an output in a column interleave format, no chroma interpolation is needed since the 4:2:2 chroma information is sufficient.

The pixel stream is then sent to a color space converter module 59, which performs color space conversion, as needed. For example, if a pixel stream is received in YCbCr format and the display format requires RGB, the pixel stream must be converted to the appropriate format.

The pixel stream is then processed by an output channels manager 61 which routes the incoming pixel stream to one of the channels merger 63 or mux units 65, 67 depending on the output format desired.

If an anaglyph format output is desired, both the left frame and the right frame will be sent to the channels merger 63 simultaneously. For a page flipping format, the left frame is outputted to the mux units 65, 67, followed by the right frame being directed to mux units 65, 67. For a dual stream format, the left frame is sent to mux 65, while the right frame is sent to mux 67 simultaneously.

The channels merger module 63 receives the two channels (left and right) and combines them using a merging algorithm, for example, the anaglyph algorithm. In the case in which the display device is an auto stereoscopic display, a column interleave algorithm is used to produce the appropriate output format.

Mux unit 65 receives a pixel stream coming from the output channels manager 61, as described above, and a merged pixel stream output by the channels merger 63. The mux 65 chooses between the two sources depending on the desired output. For page flip or dual stream derived output, the pixel stream from the output channel manager 61 would be used, while for merged channel output (anaglyph), the pixel stream from the channel merger 63 would be selected.

The mux unit 67 functions in a similar manner to mux unit 65, providing the complementary output. The outputs of the two mux units 65, 67 are ready to be processed by external video display drivers.

With respect to FIG. 7, the integration of a SIP 33 within a DVD player will now be described. The DVD source, containing a compressed stereoscopic image stream is read by the DVD driver and the optical disk controller 97 provides a compressed stereoscopic image stream to the codec 93, which in the preferred embodiment of the present invention is an MPEG2 audio/video decoder contained within a Toshiba TC81211F chip.

The codec 93 decompresses the image stream and buffers it in order to serialize it and output a pixel stream. The pixel stream is sent to SIP 33 for processing as per the method of the present invention. The SIP 33 outputs a pixel stream in a format in accordance with the display unit to which the DVD player is connected. If shutter glasses are used, the SIP 33 also outputs a glasses synchronization signal in order to synchronize the rate of the glasses with that of the image frame rate. The pixel stream is then sent to the Audio/Video Out 95, which also receives an audio signal from the codec 93, to be formatted into a display signal. The output of the audio/Video out 95 module is either an analog or a digital signal depending on the type of display device used.

In alternative embodiments of the present invention, the SIP 33 could be provided integrated within the codec module 93.

Figure 8:
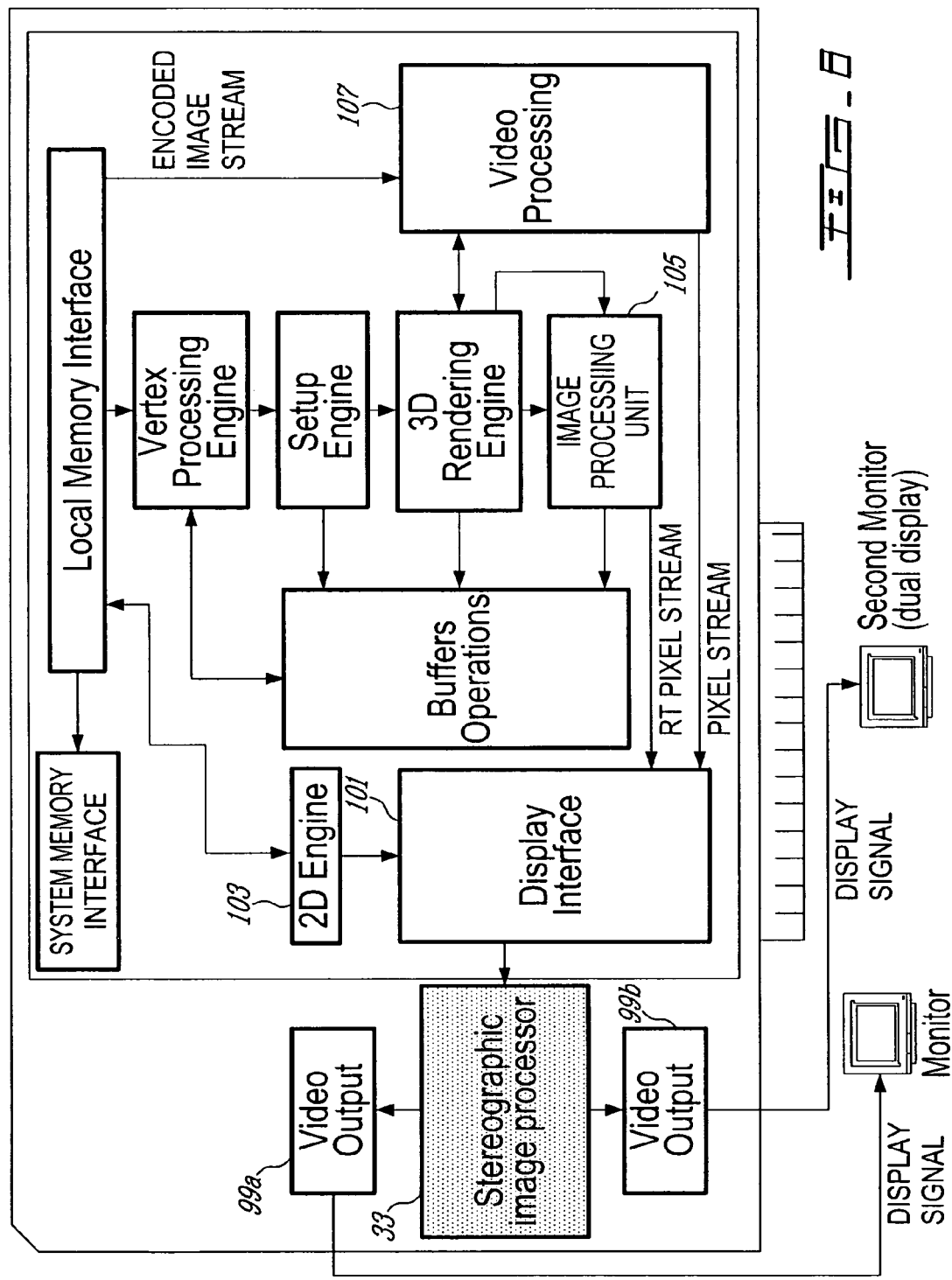
FIG. 8 is a block diagram of a graphic card using the stereoscopic image processor system of the present invention.

Now, referring to FIG. 8, a configuration within a graphics card will be described. In such an environment, the stereoscopic image frames can come from a variety of sources, in a variety of formats, such that a plurality of units will interact to process them. For example, stereoscopic image frames could be encoded as an MPEG2 video stream, originating from a DVD source or from the computers hard drive, and be received at the video processing module 107. The video processing module 107 decodes the video stream and serializes the image stream, such that it outputs a pixel stream.

The stereoscopic image frames could also come to the image processing unit 105 through a real-time 3*d* rendering pipeline. The image processing unit 105 is the last stage of the real-time stereoscopic rendering pipeline and implements various filters to enhance the pixel stream before sending it to the display interface 101.

Alternatively, the stereoscopic image frames could come from the 2D engine 103.

The display interface 101 receives image streams from a plurality of sources, as described above. The display interface 101 chooses an input source for the pixel stream and routes it to the SIP 33. The SIP 33 formats it according to the method of the present invention and outputs either alternate left/right image streams, or a merged stream, depending on the type of display output used. A glasses sync signal is also output by the SIP 33 for synchronizing the operation of glasses, if shutter glasses are used.

The formatted pixel stream is sent to the video output 99*a*, 99*b* modules for processing. The video output 99 is a display controller that receives the pixel stream and provides a display signal.

In another embodiment, as seen in FIG. 9, the SIP 33 of the present invention could be integrated into a gaming console.

In this configuration, the graphics synthesizer 111 receives graphical instructions and data from the CPU and uses them to create a real-time pixel stream. Alternatively, the graphics synthesizer may receive a video stream from a DVD source, in which case it serializes it to produce a pixel stream which is routed to the SIP 33.

The SIP 33 receives the pixel stream and creates left and right frames in a desired output format, as per the method of the present invention. The SIP 33 may also output a glasses sync signal in the case in which shutter glasses are used.

In a last step, the display controller 113 receives the formatted pixel stream from the SIP 33 and an audio stream coming from the sound processor. The display controller 113 formats the pixel stream and outputs a display signal.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A system for processing a compressed image stream of a stereoscopic image stream, said compressed image stream having a plurality of frames in a first format, each frame consisting of a merged image formed by juxtaposing a sampled image frame of a left image and a sampled image frame of a right image, each sampled image frame having half a number of original pixels forming a staggered quincunx pattern in which original pixels surround missing pixels, said system comprising:

a receiver for receiving said compressed image stream;

a decompressing module in communication with said receiver for decompressing said compressed image stream;

a frame buffer connected to said decompressing module for receiving and storing frames of said merged image of said decompressed image stream;

a serializing unit for reading pixels of said frames stored in said frame buffer and outputting a pixel stream comprising pixels of a left frame and pixels of a right frame;

a stereoscopic image processor configured to receive said pixel stream, to buffer said pixels, to perform interpolation in order to reconstruct missing pixels of each of said left and right images using only original pixels of the respective one of said left and right images and to output a reconstructed left pixel stream and a reconstructed right pixel stream, wherein said interpolating comprises, for each missing pixel:

calculating a horizontal change parameter by using percentages of said original pixel values in the columns immediately to the left and immediately to the right of said missing pixel;

calculating a vertical change parameter by using percentages of said original pixel values in the rows immediately above and immediately below said missing pixel;

computing an edge-dependent weighting factor from said horizontal factor and said vertical factor;

calculating a vertical component by applying a filter to at least one neighboring pixel to the left and at least one neighboring pixel to the right of said missing pixel, said neighboring pixels being located along a same horizontal line;

calculating a horizontal component by applying a filter to at least one neighboring pixel above and at least one neighboring pixel below said missing pixel, said neighboring pixels being located along a same vertical line; and computing said missing pixel value from said weighting factor, said horizontal component and said vertical component;

a display signal generator receiving said stereoscopic pixel stream to provide an output display signal.

2. A system as claimed in claim 1, wherein said stereoscopic image processor comprises:

an interpolation module for forming a reconstructed left frame and a reconstructed right frame from said pixel stream;

an output module for outputting said reconstructed stereoscopic image stream in a format different from said first format, said output module comprising:

a display mode controller for selecting one of a plurality of stereoscopic display modes and outputting said reconstructed frames in said selected mode.

3. A system as claimed in claim 2, wherein said output module further comprises:

a display rate controller for controlling a display rate of said frames.

4. A system as claimed in claim 3, wherein said display rate controller comprises a temporal interpolator and wherein said controlling said display rate of said frames comprises time interpolation of said frames.

5. A system as claimed in claim 2, said plurality of stereoscopic display modes comprises at least two of a page flipping, line interleaved, a column interleaved, an anaglyphic, a dual stream display and a monoscopic display mode.

6. A system as claimed in claim 1, wherein said compressed image stream is stored as a DVD and further comprising a DVD reader providing said compressed image stream to said receiver.

7. A system as claimed in claim 1, wherein said receiver, said decompressing module, said frame buffer and said serializing unit are integrated into a single chip receiving said compressed image stream and outputting said pixel stream.

8. A system as claimed in claim 1, further comprising a synchronization module for synchronizing shutter eyeglasses.

9. A system as claimed in claim 1, wherein said serializing unit and said display signal generator are driven by a common pixel clock.

10. A system as claimed in claim 9, wherein said stereoscopic image processor uses said common pixel clock and outputs said stereoscopic pixel stream with a 5-line delay.

11. A system as claimed in claim 9, wherein said stereoscopic image processor uses said common pixel clock and outputs said stereoscopic pixel stream with one image frame delay.

12. A system as claimed in claim 1, wherein said filter is the arithmetic mean of two pixels.

13. A method for processing a stereoscopic image stream, the stereoscopic image stream including a plurality of frames, each frame formed by juxtaposing a sampled image frame of a left image and a sampled image frame of a right image, each sampled image frame having half a number of original pixels forming a staggered quincunx pattern in which original pixels surround missing pixels, said method comprising:
  for each frame of the stereoscopic image stream, reconstructing stereoscopic left and right image frames from the sampled image frames juxtaposed in the respective frame of the stereoscopic image stream, by interpolating missing pixel values for each of said stereoscopic left and right image frames using only the original pixels of the respective sampled image frame, wherein said interpolating includes, for each missing pixel:
  providing a horizontal edge sensitivity parameter;
  calculating horizontal weighting factors by using said horizontal edge sensitivity parameter and at least two neighboring pixels to the left and at least two neighboring pixels to the right of said missing pixel, said neighboring pixels being located along a same horizontal line;
  providing a vertical edge sensitivity parameter;
  calculating vertical weighting factors by using said vertical edge sensitivity parameter and at least two neighboring pixels above and at least two neighboring pixels below said missing pixel, said neighboring pixels being located along a same vertical line;
  computing a first intermediate pixel value by using said weighting factors and intensity values of at least one neighboring pixel to the left and at least one neighboring pixel to right of said missing pixel, said neighboring pixels being located along a same horizontal line;
  computing a second intermediate pixel value by using said weighting factors and intensity values of at least one neighboring pixel above and at least one neighboring pixel below said missing pixel, said neighboring pixels being located along a same vertical fine;
  computing said missing pixel value by using said first intermediate pixel value and said second intermediate pixel value;
  outputting a reconstructed stereoscopic pixel stream for use in generating a display signal.

14. A method as claimed in claim 13, wherein said computing said missing pixel comprises taking the mean of said first intermediate pixel value and said second intermediate pixel value.

15. A system for processing a compressed image stream of a stereoscopic image stream, said compressed image stream having a plurality of frames in a first format, each frame consisting of a merged image formed by juxtaposing a sampled image frame of a left image and a sampled image frame of a right image, each sampled image frame having half a number of original pixels forming a staggered quincunx pattern in which original pixels surround missing pixels, said system comprising:
  a receiver for receiving said compressed image stream;
  a decompressing module in communication with said receiver for decompressing said compressed image stream;
  a frame buffer connected to said decompressing module for receiving and storing frames of said merged image of said decompressed image stream;
  a serializing unit for reading pixels of said frames stored in said frame buffer and outputting a pixel stream comprising pixels of a left frame and pixels of a right frame;
  a stereoscopic image processor configured to receive said pixel stream, to buffer said pixels, to perform interpolation in order to reconstruct missing pixels of each of said left and right images using only original pixels of the respective one of said left and right images and to output a reconstructed left pixel stream and a reconstructed right pixel stream, wherein said interpolating comprises, for each missing pixel:
  providing a horizontal edge sensitivity parameter;
  calculating horizontal weighting factors by using said horizontal edge sensitivity parameter and at least two neighboring pixels to the left and at least two neighboring pixels to the right of said missing pixel, said neighboring pixels being located along a same horizontal line;
  providing a vertical edge sensitivity parameter;
  calculating vertical weighting factors by using said vertical edge sensitivity parameter and at least two neighboring pixels above and at least two neighboring pixels below said missing pixel, said neighboring pixels being located along a same vertical line;
  computing a first intermediate pixel value by using said weighting factors and intensity values of at least one neighboring pixel to the left and at least one neighboring pixel to the right of said missing pixel, said neighboring pixels being located along a same horizontal line;
  computing a second intermediate pixel value by using said weighting factors and intensity values of at least one neighboring pixel above and at least one neighboring pixel below said missing pixel, said neighboring pixels being located along a same vertical fine; and computing said missing pixel value by using said first intermediate pixel value and said second intermediate pixel value;

a display signal generator receiving said stereoscopic pixel stream to provide an output display signal.

16. A system as claimed in claim 15, wherein said computing said missing pixel comprises taking the mean of said first intermediate pixel value and said second intermediate pixel value.

17. A method for processing a stereoscopic image stream, the stereoscopic image stream including a plurality of frames, each frame formed by juxtaposing a sampled image frame of a left image and a sampled image frame of a right image, each sampled image frame having half a number of original pixels forming a staggered quincunx pattern in which original pixels surround missing pixels, said method comprising:

for each frame of the stereoscopic image stream, reconstructing stereoscopic left and right image frames from the sampled image frames juxtaposed in the respective frame of the stereoscopic image stream, by interpolating missing pixel values for each of said stereoscopic left and right image frames using only the original pixels of the respective sampled image frame, wherein said interpolating includes, for each missing pixel:

calculating a horizontal change parameter by using percentages of the original pixel values in the columns immediately to the left and immediately to the right of said missing pixel;

calculating a vertical change parameter by using percentages of the original pixel values in the rows immediately above and immediately below said missing pixel;

computing an edge-dependent weighting factor from said horizontal factor and said vertical factor;

calculating a vertical component by applying a filter to at least one neighboring pixel to the left and at least one neighboring pixel to the right of said missing pixel, said neighboring pixels being located along a same horizontal line;

calculating a horizontal component by applying a filter to at least one neighboring pixel above and at least one neighboring pixel below said missing pixel, said neighboring pixels being located along a same vertical line; and computing said missing pixel value from said weighting factor, said horizontal component and said vertical component;

outputting a reconstructed stereoscopic pixel stream for use in generating a display signal.

18. A method as claimed in claim 17, wherein said filter is the arithmetic mean of two pixels.

* * * * *